United States Patent
Speidel et al.

(10) Patent No.: US 10,012,135 B2
(45) Date of Patent: *Jul. 3, 2018

(54) AIR-GUIDING COMPONENT WITH AN INTERCOOLER

(71) Applicants: MANN+HUMMEL GMBH, Ludwigsburg (DE); Modine Manufacturing Company, Racine, WI (US)

(72) Inventors: Gerrit-Tobias Speidel, Ludwigsburg (DE); Adrien Retter, Bietigheim-Bissingen (DE); Herbert Pietrowski, Pleidelsheim (DE); Vladimír Príborský, Trebíc (CZ)

(73) Assignees: MANN+HUMMEL GmbH, Ludwigsburg (DE); Modine Manufacturing Company, Racine, WI (US)

( * ) Notice: Subject to any disclaimer, the term of this patent is extended or adjusted under 35 U.S.C. 154(b) by 1067 days.

This patent is subject to a terminal disclaimer.

(21) Appl. No.: 14/258,833

(22) Filed: Apr. 22, 2014

(65) Prior Publication Data
US 2014/0311143 A1    Oct. 23, 2014

(30) Foreign Application Priority Data
Apr. 23, 2013 (DE) .................. 10 2013 006 956

(51) Int. Cl.
*F02B 33/00* (2006.01)
*F02B 37/00* (2006.01)
(Continued)

(52) U.S. Cl.
CPC .......... *F02B 37/00* (2013.01); *F02B 29/0437* (2013.01); *F02B 29/0475* (2013.01);
(Continued)

(58) Field of Classification Search
CPC .. F02B 37/00; F02B 29/0475; F02B 29/0437; F02M 35/10268; F02M 35/10354; F02M 35/10321; Y02T 10/146
See application file for complete search history.

(56) References Cited

U.S. PATENT DOCUMENTS

| 4,565,177 A | 1/1986 | Roettgen et al. |
|---|---|---|
| 7,775,266 B2 | 8/2010 | Freitag et al. |

(Continued)

FOREIGN PATENT DOCUMENTS

| DE | 102006051000 A1 | 7/2007 |
|---|---|---|
| DE | 102012204121 A1 | 9/2013 |

(Continued)

*Primary Examiner* — Hung Q Nguyen
(74) *Attorney, Agent, or Firm* — James Hasselbeck

(57) ABSTRACT

An air-guiding component for a charged internal combustion engine has an intercooler provided with coolant connectors that is disposed in a housing of the air-guiding component. The housing has at least two housing parts including a basic housing part. The housing is provided with at least one inlet and at least one outlet for charge air and is further provided with at least one passage for the coolant connectors of the intercooler. The intercooler is arranged between the at least one inlet and the at least one outlet so as to be flowed through by the charge air. The housing has housing walls and at least one of the housing walls has at least one corrugation.

18 Claims, 8 Drawing Sheets

(51) Int. Cl.
*F02M 35/10* (2006.01)
*F02B 29/04* (2006.01)

(52) U.S. Cl.
CPC ............... *F02M 35/10268* (2013.01); *F02M 35/10321* (2013.01); *F02M 35/10354* (2013.01); *Y02T 10/146* (2013.01)

(56) References Cited

U.S. PATENT DOCUMENTS

| | | |
|---|---|---|
| 8,651,092 B2 | 2/2014 | Ghiani |
| 8,695,574 B2 * | 4/2014 | Nguyen ............... F02B 29/0475 123/540 |
| 2007/0175617 A1 | 8/2007 | Brost et al. |
| 2009/0014153 A1 | 1/2009 | Pimentel et al. |
| 2010/0089548 A1 | 4/2010 | Braic et al. |
| 2010/0206534 A1 | 8/2010 | Amaya et al. |
| 2012/0043063 A1 | 2/2012 | Schatz et al. |
| 2013/0192803 A1 | 8/2013 | Garret et al. |
| 2014/0311142 A1 | 10/2014 | Speidel et al. |

FOREIGN PATENT DOCUMENTS

| | | |
|---|---|---|
| EP | 0285504 A1 | 10/1988 |
| EP | 1772616 A1 | 4/2007 |
| WO | 2008061692 A1 | 5/2008 |

\* cited by examiner

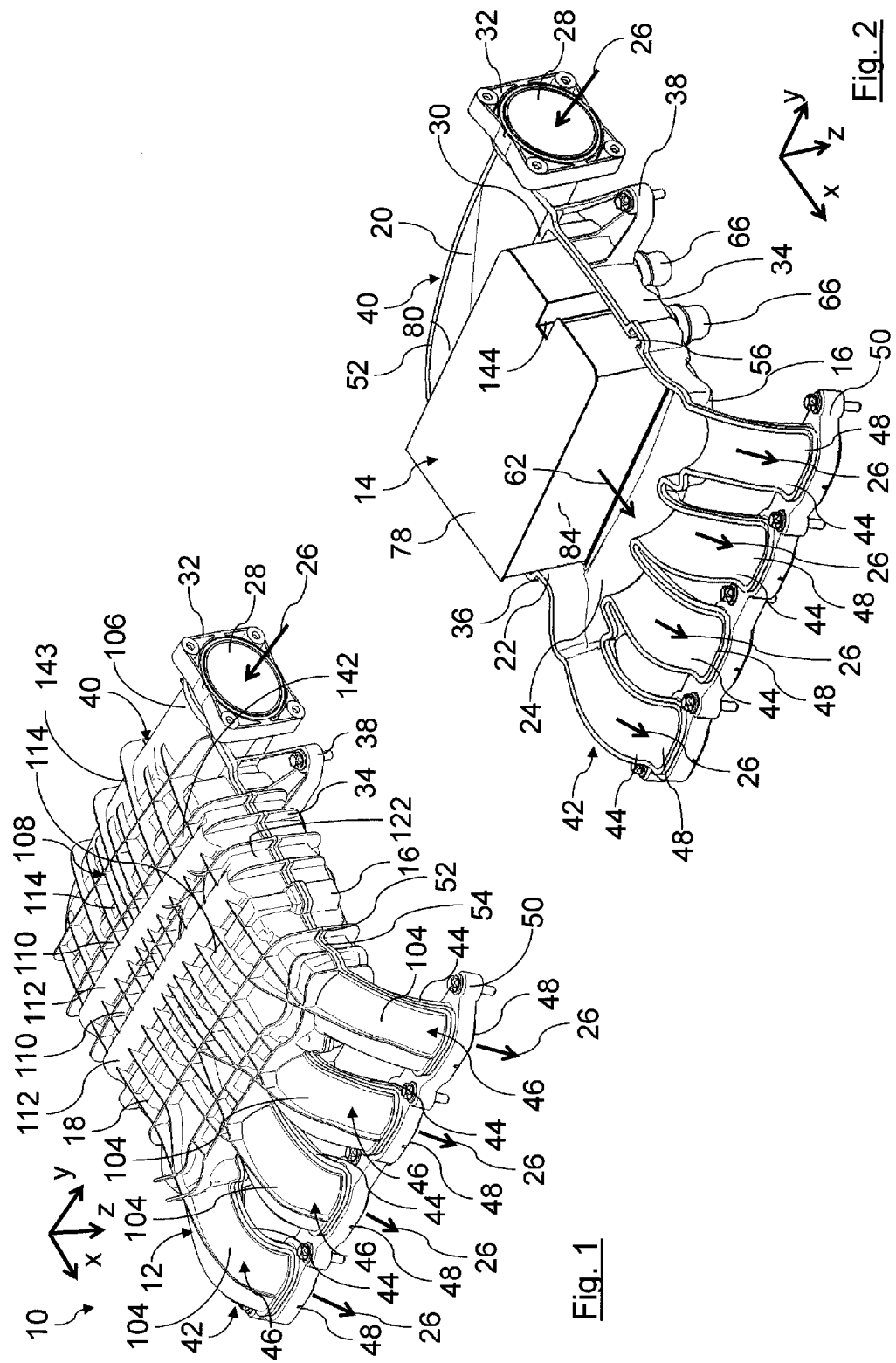

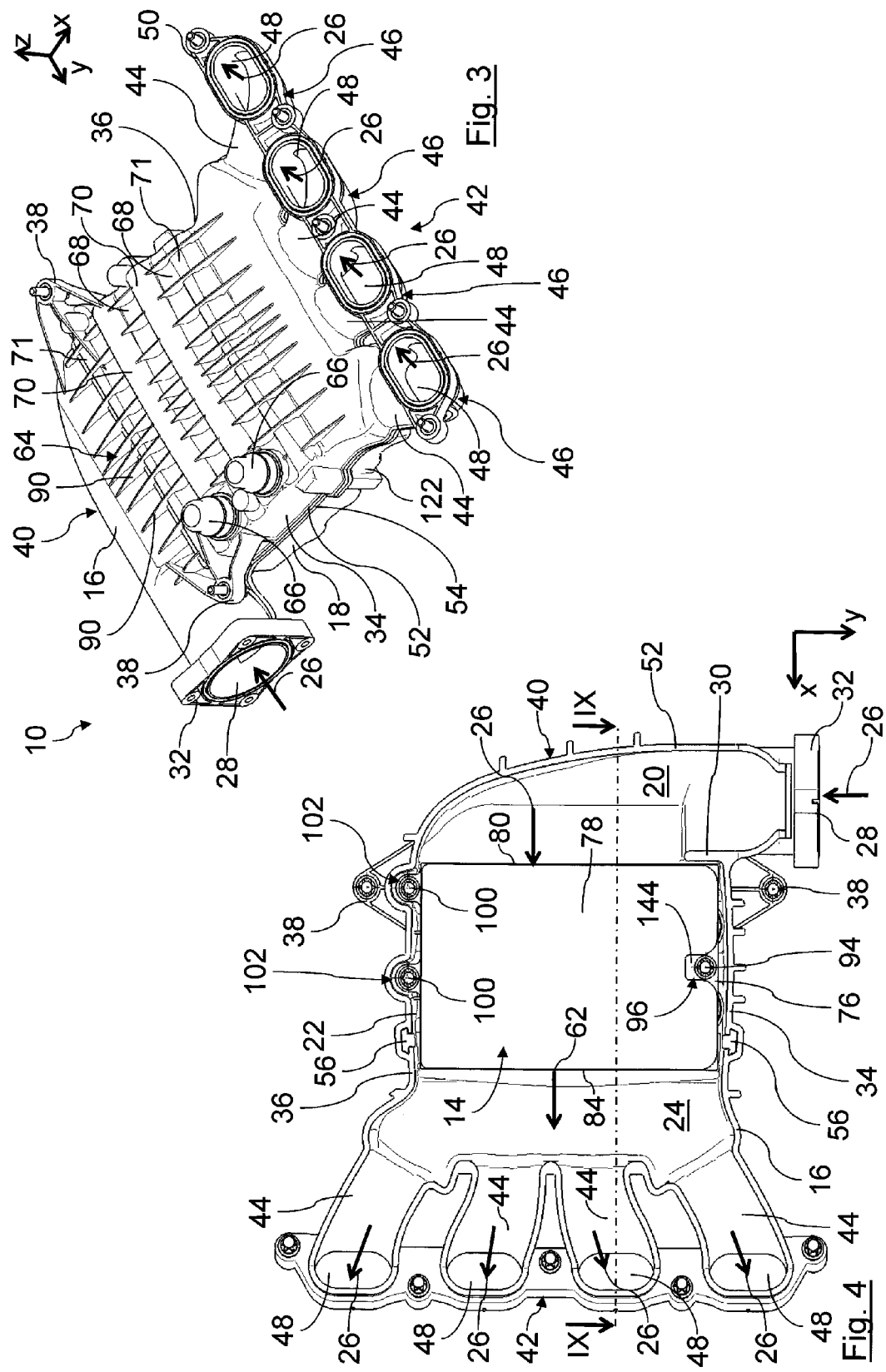

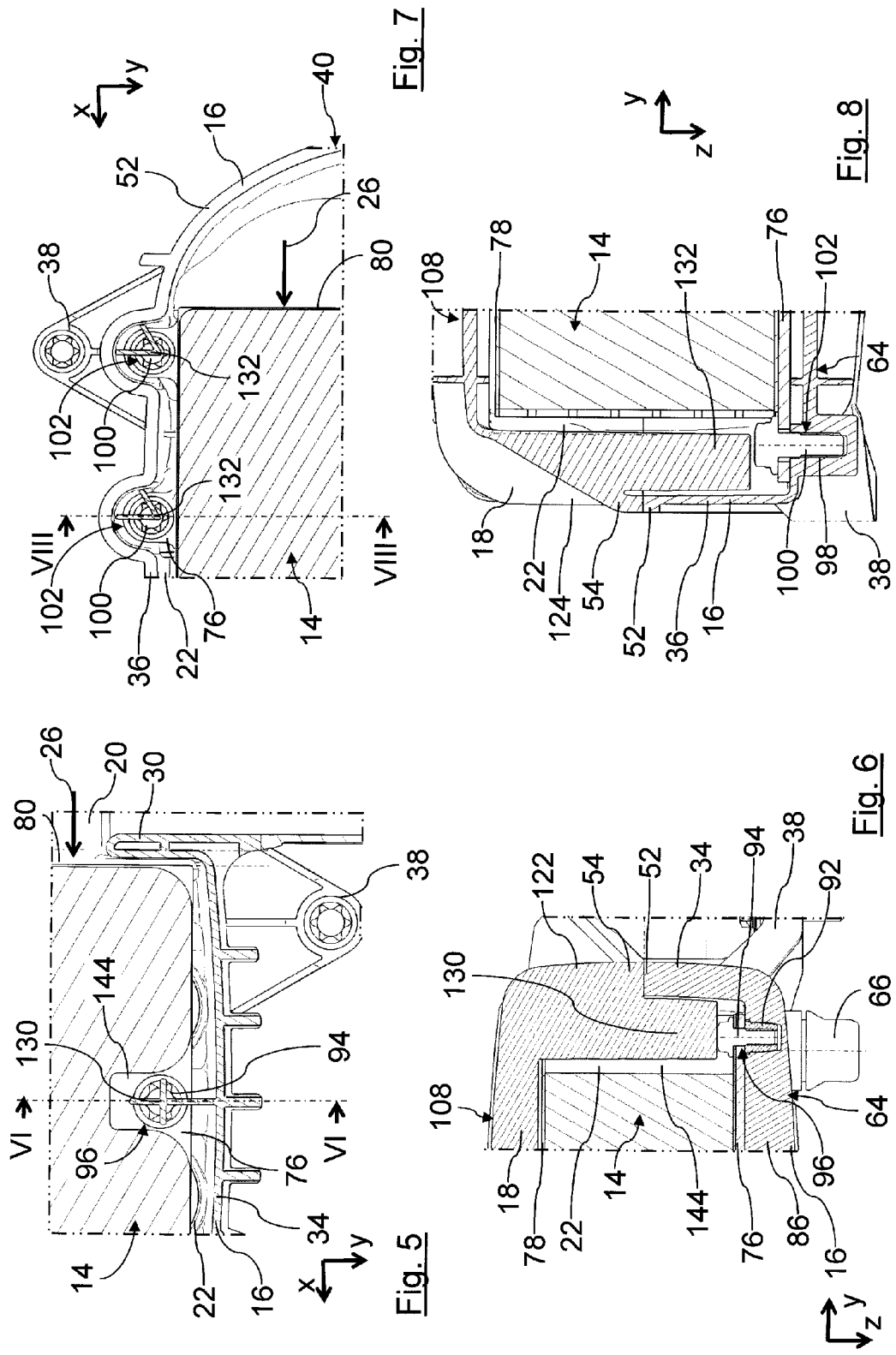

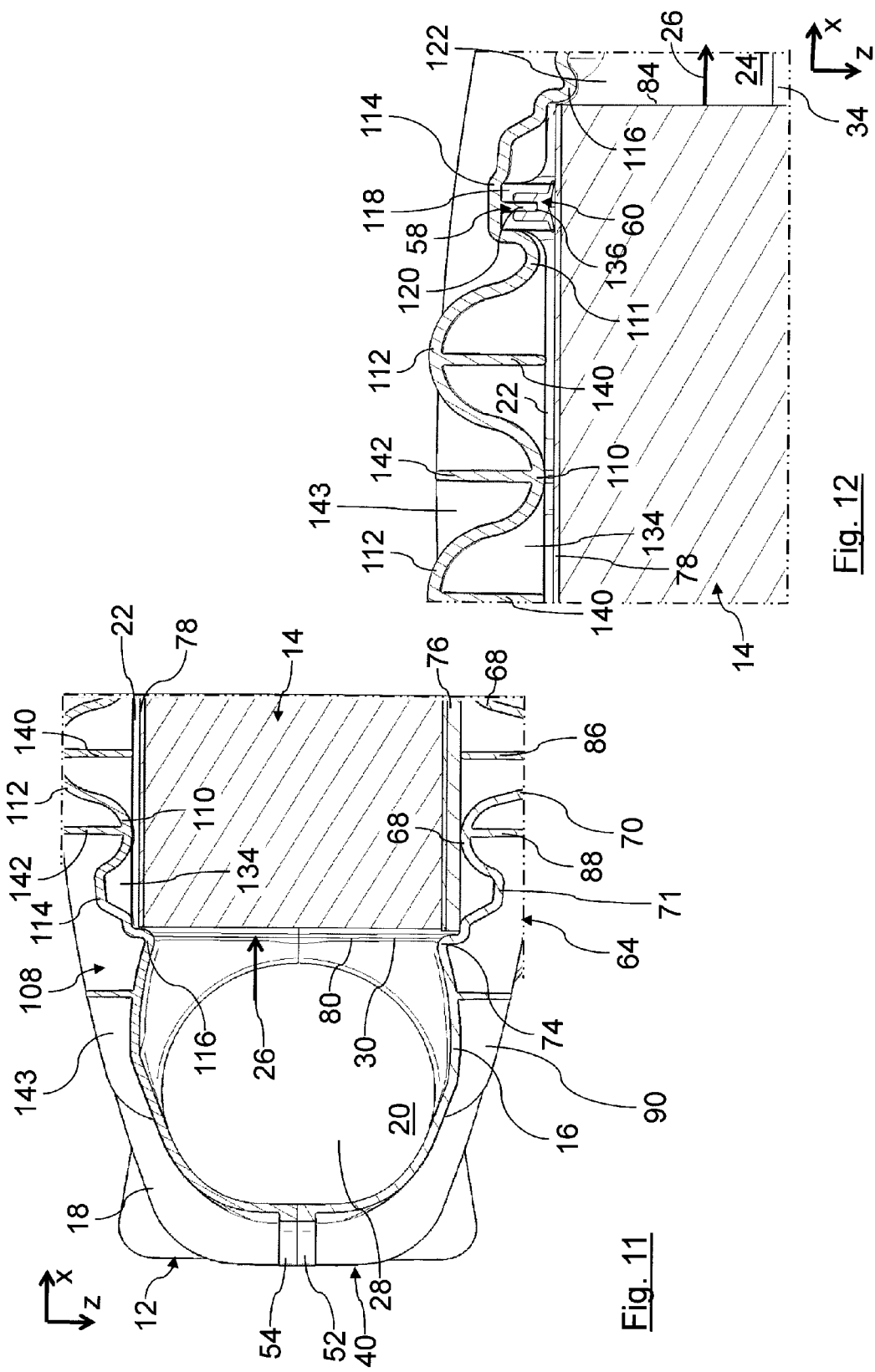

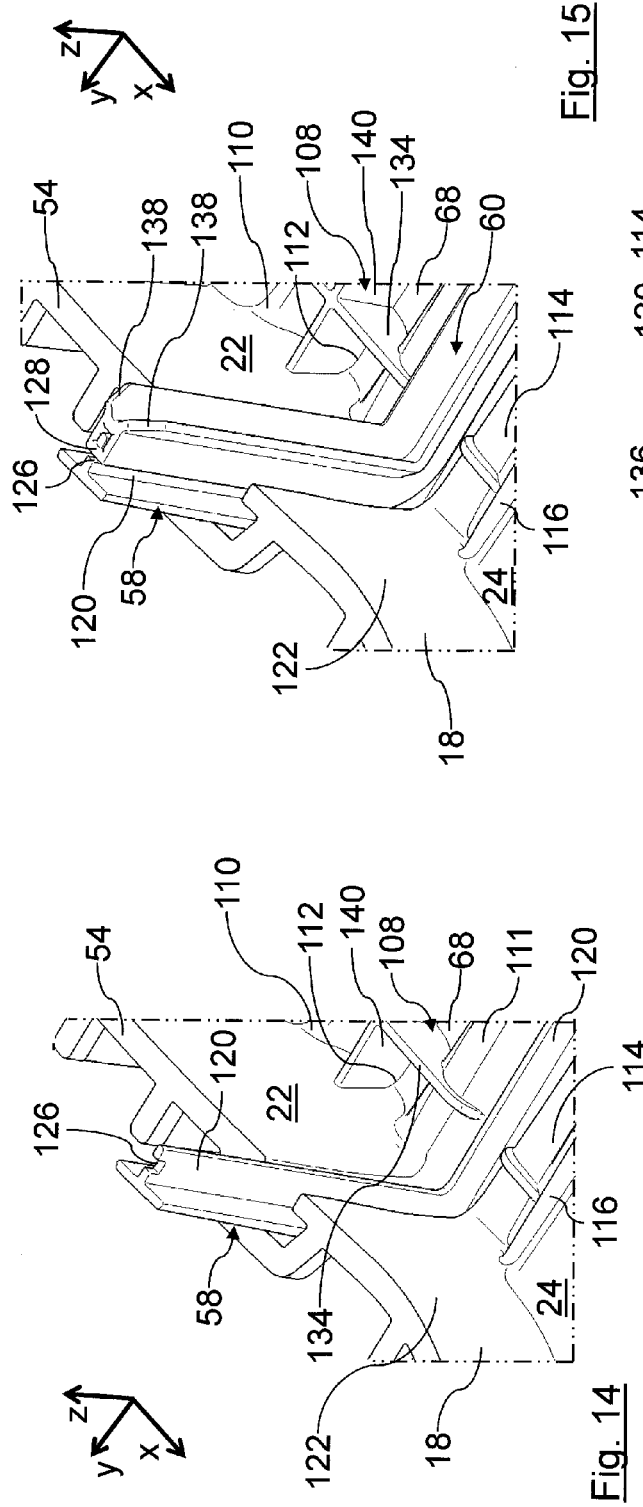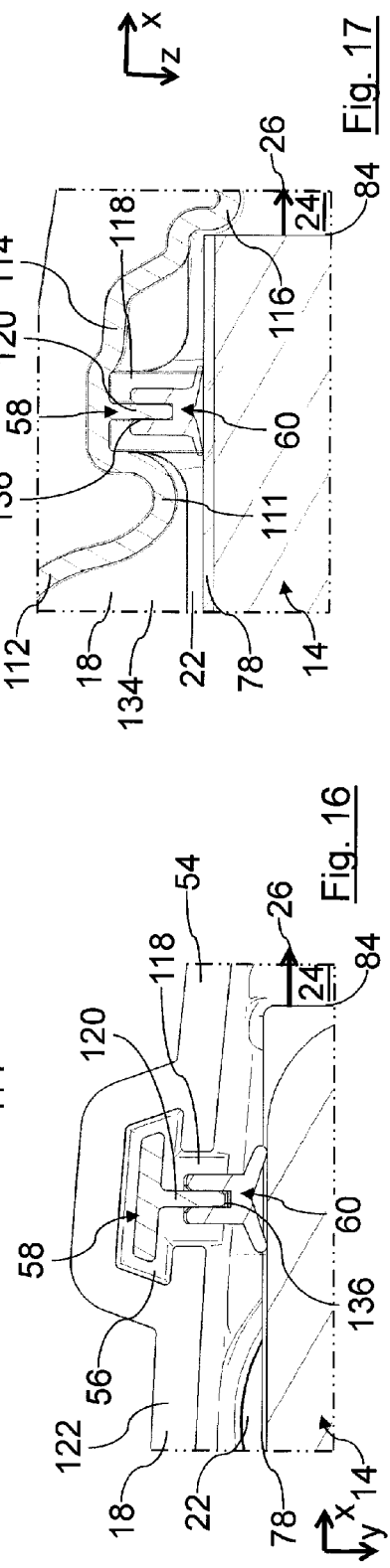

AIR-GUIDING COMPONENT WITH AN INTERCOOLER

CROSS-REFERENCE TO RELATED APPLICATION

This application claims the benefit of German patent application No. 10 2013 006 956.4 filed Apr. 23, 2013, the entire contents of the aforesaid German patent application being incorporated herein by reference.

BACKGROUND OF THE INVENTION

The invention concerns an air-guiding component, in particular an intake manifold, with an intercooler of a charged internal combustion engine, in particular of a motor vehicle, comprising a housing that is assembled of at least two housing parts, that comprises at least one inlet and at least one outlet for charge air, at least one passage for coolant connectors of the intercooler, and in which the intercooler is arranged between the at least one inlet and the at least one outlet so as to be flowed through by charge air.

WO 2008/061692 A1 discloses a modular component group of a turbo-charged internal combustion engine. The modular component group comprises an intake manifold and a heat exchanger for the intake air. The modular component group comprises a housing which together with a cover defines a volume in which the heat exchanger is arranged. The housing comprises an inlet for the intake air. The intake manifold socket opens toward a cylinder head of the internal combustion engine through outlets for the intake air at a front side of the housing. The intake air flows through the heat exchanger. The heat exchanger is connected with a coolant circuit.

It is an object of the invention to design an air-guiding component of the aforementioned kind in which an air flow through the air-guiding component, in particular through the intercooler, is further improved and which has a high component stiffness with minimal material investment. In particular, cooling of the charge air with the intercooler is to be further improved.

SUMMARY OF THE INVENTION

This object is solved according to the invention in that at least one of the housing walls of the housing of the air-guiding component has at least one corrugation.

According to the invention, the at least one corrugation contributes to reinforcement of the at least one housing wall of the housing of the air-guiding component. It can improve the stability of the housing of the air-guiding component.

The at least one corrugation can be advantageously a depression or a bulge of the at least one housing wall. It can be a trough-shaped depression in the at least one housing wall. A corrugation wall of the at least one corrugation can be advantageously approximately in the form of a section of a cylinder wall, in particular of a circular cylinder wall.

The at least one corrugation can extend in longitudinal direction advantageously transversely to the main axis of the intercooler. The at least one corrugation can extend between the inlet side of the intercooler and the outlet side in the direction of a width of the intercooler that extends transversely to the main axis.

A corrugation wall of at least one inner corrugation can advantageously extend into an interior of the housing of the air-guiding component. In this way, the corrugation wall of the inner corrugation can impair a flow of the charge air past the intercooler, in particular reduce it. The at least one inner corrugation can advantageously extend in its longitudinal extension across the entire appropriate extension, in particular width, of the intercooler, optionally of a flange plate of the intercooler.

In a further advantageous embodiment, an exterior side of a corrugation wall of at least one inner corrugation which is facing the intercooler can rest seal-tightly on the corresponding exterior side of the intercooler, optionally of the flange plate of the intercooler. In this way, the sealing action between the intercooler and the housing wall of the housing of the air-guiding component can be improved. The corrugation wall of the at least one inner corrugation can advantageously contact across the entire width of the intercooler, optionally of the flange plate, on the corresponding exterior side of the intercooler, in particular of the flange plate. In this way, the area between the intercooler and the corresponding housing wall of the housing of the air-guiding component can be sealed across the entire width of the intercooler, in particular of the flange plate.

Advantageously, the corrugation wall of the at least one inner corrugation provided on the basic housing part of the housing of the air-guiding component can be resting on the exterior side of the intercooler, optionally of the flange plate. In this way, on the side of the basic housing part a sealing action can be realized without a separate sealing element, in particular a separate seal, being required.

Alternatively or additionally, a corrugation wall of at least one outer corrugation on the housing of the air-guiding component can extend advantageously outwardly.

In a further advantageous embodiment, a corrugation wall of at least one inner corrugation, with its side that is facing the intercooler, can be spaced apart from the corresponding exterior side of the intercooler. An appropriate gap between the corrugation wall and the exterior side of a cooler housing of the intercooler can be provided. The gap can serve as a tolerance compensation. With it, appropriate manufacture-related and/or assembly-related and/or operation-related tolerances can be compensated.

Advantageously, on one side of the intercooler, the corrugation wall of the at least one inner corrugation can rest on the corresponding housing wall and, on the opposite side of the intercooler, the corrugation wall of at least one oppositely positioned inner corrugation can be spaced apart from the oppositely positioned housing wall of the intercooler.

In a further advantageous embodiment, in or on at least one corrugation at least one reinforcement rib can be arranged. The at least one reinforcement rib can be advantageously arranged within the at least one corrugation. The at least one reinforcement rib can stabilize the corrugation wall of the at least one corrugation. It can contribute to stiffening of the housing of the air-guiding component. It can improve the stability of the housing of the air-guiding component. The at least one reinforcement rib can be advantageously extending across the length extension of the at least one corrugation. It can advantageously be arranged approximately at the center of the at least one corrugation. It can advantageously bisect the at least one corrugation.

The at least one reinforcement rib can advantageously extend radially to a longitudinal axis of the at least one corrugation. It can be extending advantageously perpendicularly to the corresponding exterior side of the intercooler, in particular the housing wall of the cooler housing or the flange plate.

Should the corrugation wall of the at least one corrugation extend from the interior of the housing of the air-guiding component to the exterior, i.e., an inner corrugation is concerned, the at least one reinforcement rib can extend as an inner reinforcement rib into the interior of the housing of the air-guiding component. The at least one inner reinforcement rib can thus disturb a flow of the charge air past the cooler housing of the intercooler, in particular reduce it.

Inasmuch as the corrugation wall of the at least one corrugation extends into the interior of the housing of the air-guiding component, i.e., an outer corrugation is concerned, the at least one reinforcement rib can be located as an outer reinforcement rib on the exterior side of the housing of the air-guiding component.

In a further advantageous embodiment, the at least one inner reinforcement rib can be supported with its free rim on an appropriate exterior side of the intercooler. In this way, the stability of the air-guiding component, in particular of the housing of the air-guiding component, can be further improved. Moreover, the securing action of the intercooler in the housing of the air-guiding component can be improved. Advantageously, the at least one inner reinforcement rib can be supported seal-tightly on the exterior side of the intercooler. In this way, the sealing action thereat can be further improved.

The at least one inner reinforcement rib can be located advantageously on the basic housing part. Advantageously, the at least one inner reinforcement rib can be supported on the flange plate or the housing wall of the cooler housing.

In a further advantageous embodiment, at least one inner reinforcement rib, with its free rim, can be spaced apart from the corresponding exterior side of the intercooler. It is possible to have corresponding gaps thereat. The gaps can be serving as tolerance compensation. In this way, corresponding manufacture-related and/or installation-related and/or operation-related tolerances can be compensated. The at least one inner reinforcement rib can be located advantageously on the side opposite the basic housing part. The free rim of the at least one inner reinforcement rib, with its free rim, can advantageously be spaced apart from the corresponding housing wall of the cooler housing of the intercooler.

The at least one inner reinforcement rib can extend advantageously across the entire width of the intercooler. In this way, a disturbance of the flow of the charge air, in particular a sealing action, across the entire width of the intercooler can be realized.

Advantageously, at least one inner reinforcement rib with its free rim can be resting on one side on the exterior side of the intercooler and, on the opposite side of the intercooler, the free rim of at least one opposite inner reinforcement rib can be spaced apart from the corresponding exterior side of the intercooler. In this way, on one side of the intercooler a sealing action of a space between the intercooler and the corresponding wall of the housing of the air-guiding component can be improved in a simple way. At the same time, a tolerance compensation can be realized on the other side of the intercooler.

Advantageously, the free rim of the at least one inner reinforcement rib can be resting on the exterior side of the intercooler on the same side where the corresponding corrugation wall of the at least one inner corrugation is resting also.

Advantageously, the free rim of the at least one inner reinforcement rib can be spaced apart from the exterior side of the intercooler on the same side where also the corresponding corrugation wall of the at least one inner corrugation is spaced apart.

Advantageously, the at least one housing wall of the housing of the air-guiding component can be resting only along the corrugation wall of the at least one inner corrugation and/or the free rim of the at least one inner reinforcement rib on the exterior side of the intercooler. This can have a positive effect on noise development during operation of the internal combustion engine.

Advantageously, several corrugations and/or several reinforcement ribs can be positioned adjacent to each other, in particular parallel to each other, in at least one housing wall of the housing of the air-guiding component. Alternatingly, outer corrugations and inner corrugations can be arranged. The corrugations can advantageously realize a corrugated course of the housing wall. Advantageously, the corrugations can be provided alternatingly with an outer reinforcement rib and an inner reinforcement rib. The stability of the housing of the air-guiding component can thus be further improved as a whole.

A height of the at least one corrugation can be advantageously between approximately 10 mm and approximately 20 mm. The height of the at least one corrugation can advantageously extend approximately perpendicularly to the exterior side of the intercooler. A corresponding height of the at least one reinforcement rib can be approximately between 10 mm and 20 mm.

In a further advantageous embodiment, a corrugation wall of at least one corrugation in the area of an inlet side or an outlet side of the intercooler can have a flow contour. In this way, the flow course of the charge air into the intercooler or out of it can be improved. Advantageously, the corrugation wall of the at least one corrugation can project past the intercooler at its inlet side or its outlet side at least in a rim area. In this way, it can be prevented that charge air at the corresponding inlet side or the outlet side can bypass the intercooler. In this way, possible turbulences on the inlet side or the outlet side of the intercooler can be reduced. The charge air can thus flow directly and uniformly into a heat exchanger area, in particular, into a corresponding radiator block, of the intercooler or out of it. At the inlet side as well as at the outlet side of the intercooler, corrugation walls with corresponding flow contours can be provided. Accordingly, on the inlet side and/or the outlet side corresponding flow contours can be provided on the side which is facing the basic housing part of the housing of the air-guiding component as well as on the side of the intercooler which is facing the other housing part.

In a further advantageous embodiment, the corrugation wall of the at least one corrugation can form at least partially a seal receptacle for a sealing device. The sealing device can be arranged in a space-saving way in the seal receptacle. By means of the sealing device an area between the housing wall of the housing of the air-guiding component and the intercooler, in particular the housing wall of the cooler housing of the intercooler, can be sealed additionally. The corrugation wall with the seal receptacle can be advantageously located outside of the area of the basic housing part in which the housing wall of the housing of the air-guiding component is resting seal-tightly on the exterior side of the intercooler anyway. The corrugation wall with the seal receptacle can advantageously be located on the side of the intercooler where corrugation walls of possible further inner corrugations are spaced apart from the exterior side of the intercooler. In this way, by means of the sealing device an additional sealing action and/or tolerance compensation can be realized.

In an advantageous embodiment, the intercooler can be fastened in a basic housing part of the housing of the air-guiding components by means of a fastening device such that at least on one side of the basic housing part it separates seal-tightly the at least one inlet from the at least one outlet.

The intercooler can be attached within the basic housing part. It can be pre-mounted within the basic housing part. The intercooler can be first fixedly positioned in the basic housing part upon pre-assembly. Subsequently, at least one additional housing part, in particular a cover housing part, can be connected with the basic housing part for closing off the intake manifold housing. In this way, the assembly of the air-guiding component, in particular of the intake manifold, can be simplified as a whole. Moreover, the additional housing part can be accordingly designed more simply. The fastening device and the appropriate forces can engage substantially directly on the basic housing part. By attachment by means of the fastening device, it can be moreover prevented in a simple way that the intercooler after assembly of the air-guiding component, in particular during transport, during assembly at the internal combustion engine, or in operation of the air-guiding component, will change its position within the intake manifold housing. By means of the fastening device the intercooler can be mounted precisely in the basic housing part. In this way, possibly required mounting tolerances of the intercooler, in particular of a cooler housing of the intercooler, can be appropriately reduced in the basic housing part. The intercooler can be arranged simply in the basic housing part such that at least one of its exterior sides, in particular an exterior side of its cooler housing or a flange plate, can contact seal-tightly on at least one appropriate inner side of the basic housing part. In this way, it can be prevented that charge air can flow between the intercooler and the at least one inner side of the basic housing part and thus can bypass the intercooler. The charge air instead must pass through a heat exchanger area of the intercooler. The cooling effect can be improved in this way.

The housing of the air-guiding component can be arranged in its operating position such that the basic housing part is located spatially at the bottom. In this way, the weight of the intercooler can press against the corresponding inner side of the basic housing part. In this way, the sealing function can be further improved. Moreover, the corresponding fastening device can be relieved mechanically. Accordingly, the fastening device can be dimensioned smaller.

The air-guiding component, in particular the intake manifold, can advantageously be part of an internal combustion engine with an exhaust gas turbocharger. With the intercooler, charge air which is coming from a compressor of the turbocharger can be cooled before it is supplied to the cylinders of the internal combustion engine.

The intercooler can advantageously comprise a heat exchanger through which a coolant can flow. The intercooler can advantageously comprise a radiator block which is flowed through by the coolant. In the radiator block, a heat exchange between the charge air and the coolant can take place. The intercooler can advantageously be a so-called plate-type cooler. The coolant can be advantageously a liquid coolant, in particular cooling water or cooling water provided with additives. The coolant can be cooled in an area outside of the intake manifold by means of a cooling circuit which extends out of the intake manifold housing. The coolant can advantageously be supplied through the corresponding coolant connectors to the intercooler and can be carried away form it.

Advantageously, the cooler housing of the intercooler can rest seal-tightly with a wall that extends circumferentially relative to a main axis of the intercooler on the corresponding inner side of the basic housing part. In this way, the circumferential side of the intercooler can be sealed off in a simple way. The main axis can be defined such that it passes through an inlet side and an outlet side of the intercooler. It can indicate roughly the average flow direction in which the charge air is supplied to the intercooler and is flowing out of it.

The cooler housing can comprise advantageously a flange plate. The flange plate can be advantageously connected fixedly to the cooler housing, in particular brazed. The flange plate can be advantageously resting seal-tightly on the corresponding inner side of the basic housing part.

The invention is not limited to an air-guiding component, in particular an intake manifold, of an internal combustion engine of a motor vehicle. Instead, it can also be used in different types of internal combustion engines, in particular industrial motors.

In an advantageous embodiment, the intercooler, when the air-guiding component is assembled, can separate seal-tightly the at least one inlet and the at least one outlet relative to all housing parts adjoining the intercooler. In this way, it can be prevented that the charge air can bypass the intercooler. In this way, a forced flow through the intercooler can be achieved. The cooling action of the charge air can thus be further improved.

Advantageously, the intercooler can be surrounded completely by the housing of the air-guiding component. The intercooler can be completely disposed inside the housing of the air-guiding component. In this way, all surfaces of the cooler housing of the intercooler can be loaded pressure-neutrally, i.e., the same pressure is acting on all surfaces of the cooler housing. Moreover, sealing of the housing of the air-guiding component relative to the environment can be realized more simply because a sealing action between the intercooler and the component is required only in the area of the coolant connectors. A large circumferential seal as it is required for intercoolers that are inserted from the exterior into the component is not required because only in the area of the coolant connectors a sealing action to the exterior relative to the environment is required. Thus, the required seal extends only across a small section and entails a reduced risk of leakage.

Advantageously, the housing parts, in particular the basic housing part and the corresponding cover housing part can be integrally material bonded to each other, in particular welded, in particular hot gas welded, and/or glued. Alternatively or additionally, the housing parts can be connected to each other by at least one positive-locking connection and/or a frictional connection, in particular a screw connection, a snap-on connection, and/or a plug connection.

Advantageously, at least one of the housing parts, in particular the basic housing part and the cover housing part, can be made of plastic material. Plastic parts can be connected easily with each other, in particular by welding. Also, plastic parts can be produced simply, in particular molded.

In the areas in which the intercooler is arranged seal-tightly in the housing of the air-guiding component, in particular the basic housing part, a separate sealing device, aside from a seal at the coolant connectors, is not required. As a whole, in this way the expenditure with regard to sealing means, in particular seals, and/or mounting expenditure can be reduced.

In a further advantageous embodiment, the intercooler can be attached by a fastening device in the form of at least one fixed bearing and at least one floating bearing on the housing of the air-guiding component, in particular the basic housing part.

While fixed bearings in the meaning of the invention enable movement only for the purpose of fixation of the attachment, in particular a rotational movement, floating bearings enable prior to fixation, in addition to the movement for the purpose of fixation of the attachment, also sliding of the components relative to each other that are to be connected to each other. In this way, the components can be positioned relative to each other, in particular in order to compensate possible component tolerances and/or mounting tolerances. Also, tolerances occurring during operation by component deformation as a result of acting forces and thermal expansions as a result of different thermal expansion coefficients of intercooler and component can be compensated in this way. The at least one floating bearing is thus characterized in that, up to the point of its fixation, it enables a tolerance compensation. By means of a fixed bearing a connection without preload loss can be realized. The connection with a fixed bearing can be advantageously designed for the service life of the participating components without preload loss.

The at least one fixed bearing and the at least one floating bearing can be advantageously located on opposite sides of the intercooler. In this way, the intercooler can be stably and precisely fixed by means of the at least one fixed bearing on one side. On the other side, the intercooler can be attached with positional tolerance by means of the at least one floating bearing.

The at least one fixed bearing can be located advantageously on the side of the housing of the air-guiding component, in particular the basic housing part, on which also the at least one inlet and/or the at least one outlet is located. The at least one floating bearing can be advantageously located on the side that is facing away from the at least one inlet or the at least one outlet.

The at least one fixed bearing can advantageously comprise a connection that is rotatable and/or insertable. The at least one fixed bearing can be advantageously an insert bushing, in particular a bushing for use in hot areas or a bushing which is embedded by injection molding in the material of the component. The insert bushing can be advantageously mounted in an appropriate hole in the housing of the air-guiding component, in particular the basic housing part, in particular, pressed in. The insert bushing can be advantageously provided with an inner thread. Into the inner thread a screw member, in particular a screw, with an appropriate outer thread can be screwed in. The screw member can be preferably connected without clearance with the intercooler. The screw member can be in particular mounted in an appropriate receptacle of the intercooler, in particular pushed through a through opening. The receptacle, in particular the opening, can advantageously optionally be provided in the flange plate of the cooler housing of the intercooler.

Instead of the screw connection also a different type of rotational and/or insertable connection between the intercooler in the insert bushing can be realized. Instead of the screw also an appropriate different type of rotation/insertion element can be used. In particular, a bayonet-like connection can also be provided. Instead of the insert bushing, an insert with a bolt, in particular a threaded bolt, can be provided also. The bolt can be secured accordingly within the receptacle of the intercooler. It can be inserted through a through opening at the intercooler and fixed on an opposite side by means of a fixation element, in particular a screw nut.

Advantageously, the insert bushing and/or the appropriate rotation/insertion element, in particular the screw, can be made of metal. In this way, a metallic connection can be realized. Metallic connections have a higher stability and robustness and a reduced preload loss in comparison to connections between components of plastic with each other or components of plastic with components of metal. This can improve in particular the reliability of the air-guiding component, in particular the intake manifold, when used in connection with lifetime components.

The at least one floating bearing can comprise advantageously a rotational and/or insertable connection. Advantageously, a screw connection can be provided. Advantageously, the at least one floating bearing can comprise a screw that is in particular thread-forming. The screw can advantageously be screwed into an appropriate hole in the housing of the air-guiding component, in particular the basic housing part. The screw can be secured, on the other hand, in an appropriate receptacle of the intercooler. It can be inserted through an appropriate opening at the intercooler. Advantageously, the opening can be arranged optionally in the flange plate of the cooler housing. It can advantageously be located in a flange of the flange plate. The screw of the floating bearing can be arranged in the receptacle in the non-fixed state so as to allow clearance. At least in one direction transverse to the axis of the screw, the receptacle can be advantageously provided with an inner diameter that is greater than the outer diameter of the screw. Advantageously, the receptacle can be a slotted hole. The floating bearing is fixed only once the rotational/insertion connection is fixed.

Thread-forming screws have the advantage that they can be screwed without generating chips into the hole of the housing of the air-guiding component, in particular the basic housing part. In contrast to self-cutting screws, thread-forming screws do not cut the material of the housing, in particular the basic housing part. Instead of the thread-forming screws, the at least one floating bearing can also comprise different types of screws, in particular self-cutting ones. As an alternative, also a thread or a thread insert in or on the basic housing part can be provided into which an appropriate screw, in particular a machine screw, can be screwed. Instead of the screw connection also a different type of rotation/insertion connection, in particular a bayonet-type connection or a locking connection, can be provided. Instead of the screws, pins can be used also. The pins can be in particular hot-riveted.

In a further advantageous embodiment, at least one captive action device can be provided for securing at least one rotation/insertion element of the at least one fixed bearing and/or the at least one floating bearing. In this way, it can be prevented that the at least one rotation/insertion element after assembly, in particular in operation of the air-guiding component, in particular the intake manifold, can fall out of its receptacle.

Advantageously, the at least one captive action device can comprise at least one rib. The at least one rib can be advantageously connected to the other housing part, in particular the cover housing part. The at least one rib can be advantageously monolithically connected with the other housing part. It can be advantageously injection-molded onto the other housing part.

The at least one captive action device can advantageously be provided on a side opposite the at least one rotation/insertion element from which side the rotation/insertion element is introduced into the appropriate receptacle. The at least one captive action device can be arranged such that, upon assembly of the housing parts, it interacts automatically with the appropriate rotation/insertion element in a securing manner. The at least one captive action device, in case that the appropriate rotation/insertion element, in particular upon transport or during operation of the air-guiding component, should loosen, can provide a mechanical stop for the rotation/insertion element. Advantageously, when using screws, an undesirable unscrewing of the corresponding screws can be prevented by means of the at least one captive action device.

In a further advantageous embodiment, the basic housing part can comprise the at least one inlet and/or the at least one outlet and/or the at least one passage for the coolant connectors. In this way, the other housing parts which are used for closing off the housing of the air-guiding component can be designed simpler. Moreover, the appropriate components, in particular the intercooler and/or the connectors, can be preassembled simply in the basic housing part. The assembly of the air-guiding component can thus be further simplified.

Advantageously, the basic housing part can comprise a mounting device for mounting the housing of the air-guiding component on the internal combustion engine and/or a frame part, optionally of the motor vehicle. In particular, appropriate mounting flanges can be arranged on the exterior side of the basic housing part. In this way, a stable securing action of the air-guiding component on the internal combustion engine and/or on the frame part can be realized. Moreover, a reliable and stable force transmission between the intercooler, the basic housing part, and the internal combustion engine and/or the frame part can also be realized in this way.

Advantageously, the at least one outlet can be designed such that it can be immediately connected with a cylinder head of the internal combustion engine. In this case the air-guiding component can be designed as an intake manifold. The task of the intake manifold is inter alia the distribution of the combustion air, in particular the charge air, onto the cylinders of the internal combustion engine. For this purpose, the at least one outlet can be arranged in at least one appropriate connecting flange. The connecting flange can advantageously be connected by means of a rotation/insertion connection, in particular at least one threaded bolt or at least one screw, to the cylinder head. The at least one connecting flange can be advantageously arranged on the basic housing part. Advantageously, it can be connected monolithically to the basic housing part.

Advantageously, the housing of the air-guiding component can be combined of two housing parts. It can be advantageously in the form of two shells, in particular a top shell and a bottom shell. Advantageously, the basic housing part can be the bottom shell. The cover housing part can be the top shell.

At least the basic housing part can have dished walls. In this way, the walls can be mechanically stabilized. The dished walls can be advantageously curved in all directions. Advantageously, the dished walls can be curved outwardly from an interior of the housing of the air-guiding component to the exterior. Advantageously, all housing parts can have dished walls. Advantageously, more than one wall, preferably all walls of the housing of the air-guiding component can be dished. In this way, the stability, in particular pressure loadability, of the housing of the air-guiding component can be further improved.

In a further advantageous embodiment, between at least one exterior side of the intercooler and a corresponding housing wall of the housing of the air-guiding component at least one seal can be arranged. The at least one seal can be advantageously located on at least one exterior side which is circumferential relative to the main axis of the intercooler.

The at least one seal can advantageously be located on the side of the intercooler which is facing away from the basic housing part. Advantageously, on the side which is facing the basic housing part no separate seal is provided. The at least one seal can be advantageously located on the side of the intercooler where a corrugation wall of at least one possible inner corrugation and/or a free rim of at least one inner reinforcement rib is spaced apart from the corresponding exterior side of the intercooler.

The at least one seal can advantageously be elastic. In this way, it can simply adjust to the shape and/or the course of the corresponding exterior side of the intercooler, in particular the housing wall of the cooler housing. Moreover, in this way it can act as a tolerance compensation and/or vibration damping means. Advantageously, the seal can be realized of a foam with closed or open surface.

Advantageously, the at least one seal can be circumferentially open relative to the main axis of the intercooler. In this way, it can be arranged on the intercooler even after attachment of the intercooler in the basic housing part.

The at least one seal can be advantageously U-shaped. In this way, it can cover at least partially a side, in particular a top side, of the intercooler that is facing the basic housing part or facing away from it as well as the corresponding lateral exterior sides of the intercooler. At least one leg of the U-shaped seal can project into an interior and/or a corresponding receptacle in the wall of the basic housing part. In this way, it can seal the corresponding lateral exterior side of the intercooler relative to a corresponding sidewall of the basic housing part.

Advantageously, the at least one seal can be mounted, in particular premounted, on the housing part which is different from the basic housing part, in particular on the cover member. The housing part for closing off the housing of the air-guiding component after attachment of the intercooler in the basic housing part can be placed onto the basic housing part or inserted into it. In doing so, the seal with the housing part can be automatically properly positioned.

In a further advantageous embodiment, in at least one housing part at least one seal holder for the at least one seal can be arranged. The at least one seal holder can be advantageously designed as a sealing rib. The at least one seal holder can be advantageously arranged in the housing part that serves for closing off the basic housing part. On, at or in the at least one seal holder, the at least one seal can be pre-mounted. The at least one seal holder can be advantageously monolithically formed with the housing part. The at least one seal holder can extend circumferentially relative to the main axis of the intercooler. The at least one seal holder can advantageously be approximately U-shaped. In this way, the at least one approximately U-shaped seal can be simply secured.

The at least one seal holder can advantageously be arranged sectionwise in a corresponding receptacle, in particular groove, of the corresponding housing part. In this way, the at least one seal holder can be arranged at a defined spacing to the exterior side of the intercooler. With the defined spacing to the cooler housing of the intercooler, transitions of legs of the at least one, in particular U-shaped, seal holder and the at least one, in particular U-shaped, seal can be realized in a simple way also for larger radii of curvature.

Advantageously, the at least one seal holder can have a T-shaped profile at least in the area of the lateral circumferential walls of the intercooler. The at least one seal holder can thus be mechanically stabilized. In this way, a freestanding seal holder can be realized also.

Advantageously, the at least one seal holder and/or the at least one seal, in particular at least one corresponding leg, can project at least sectionwise past a rim, in particular a fastening flange or a welding flange, of the corresponding housing part. In this way, the projecting section, in particular leg, of the at least one seal holder and/or the at least one seal can be inserted into a corresponding holding receptacle of the basic housing part. The holding receptacle can be realized in particular in or on at least one of the sidewalls of the basic housing part. The holding receptacle can be designed as a groove of sorts.

The at least one seal can have on its side that is facing away from the intercooler an approximately U-shaped profile. The U-shaped profile can define a receptacle, in particular a holding rib receptacle, for the at least one seal holder, in particular a leg. The leg of the at least one seal holder can be inserted into the receptacle of the at least one seal. In particular, a radial section of the seal holder can be arranged in the receptacle.

On at least one free end which is facing the basic housing part, the at the at least one seal holder, in particular at least one leg of the seal holder, can comprise advantageously a seal securing groove. The at least one seal can have on the corresponding end face of the corresponding end a corresponding seal securing web. The seal securing web can engage the seal securing groove when the seal is mounted. In this way, it can be prevented that the at least one seal upon assembly of the housing parts is stripped or pulled off the seal holder.

Instead of the seal securing groove and the seal securing web, the seal can also be provided with a different type of captive securing action. Advantageously, the side of the seal which is pushed on or inserted into the seal holder can have a corresponding profile, in particular with an undercut, which can engage a corresponding counter profile of the seal holder. In this way, the seal can also be realized from a continuous profile.

The at least one seal can advantageously have an approximately Y-shaped profile. In this context, the two upper legs of the Y-profile can be facing the exterior side of the intercooler. Upon mounting on the intercooler, the upper legs of the Y-profile can be spread apart. They can thus bridge correspondingly larger gaps between the housing wall of the housing of the air-guiding component and the exterior side of the intercooler. The Y-profile enables a simple tolerance compensation across a correspondingly large range.

At least one end of the at least one seal can be provided with a bevel in the area of at least one of the two upper legs of the Y-profile. A bevel in this context is to be understood as a slanted surface in the area of an edge. In this way, upon assembly of the housing parts of the housing of the air-guiding component, pushing on the at least one seal onto the intercooler can be simplified.

Alternatively or in addition, an opening angle between the upper legs of the Y-profile can be enlarged toward at least one end of the seal. In this way, the assembly can be further simplified.

Alternatively or in addition, the length of at least one of the upper legs of the Y-profile of the at least one seal can be variably designed. In areas of possible larger operation-related deformations of the housing of the air-guiding component, in particular in the central areas of the seal, a safer sealing action can be realized by means of longer legs.

In a further advantageous embodiment, the at least one seal can be mounted, in particular premounted, also on the intercooler, in particular the cooler housing, instead of on the housing part. The at least one seal can advantageously be glued to the intercooler, in particular the cooler housing.

Advantageously, the at least one seal can be designed to be symmetric, in particular in circumferential direction. In this way, it is not required to pay attention to a mounting orientation. False installation of the at least one seal can thus be prevented.

BRIEF DESCRIPTION OF THE DRAWINGS

Further advantages, features, and details of the invention will result from the following description in which an embodiment of the invention will be explained in more detail with the aid of the drawing. A person of skill in the art will consider features that are disclosed in combination in the drawing, the description, and the claims also expediently individually and combine them to further meaningful combinations.

FIG. 1 shows in isometric illustration an intake manifold of a turbo-charged internal combustion engine of a motor vehicle, comprising an intake manifold housing in which an intercooler is arranged, in a view at a slant from above.

FIG. 2 shows the open intake manifold of FIG. 1 without cover shell.

FIG. 3 shows the intake manifold of FIG. 1 in a view at a slant from below.

FIG. 4 shows the open intake manifold of FIG. 2 in a plan view.

FIG. 5 shows a detail of a horizontal longitudinal section of the intake manifold of FIG. 1 in the area of a fixed bearing with which the intercooler is attached to a bottom shell of the intake manifold housing.

FIG. 6 shows a detail of a vertical cross-section of the intake manifold in the area of the fixed bearing of FIG. 5 along the section line VI-VI indicated therein.

FIG. 7 shows a detail of a horizontal longitudinal section of the intake manifold of FIG. 1 in the area of two floating bearings with which the intercooler is attached to the bottom shell.

FIG. 8 shows a detail of a vertical cross-section of the intake manifold in the area of a floating bearing of FIG. 7 along the indicated section line VIII-VIII.

FIG. 11 is a second detail view of the longitudinal section of FIG. 9.

FIG. 12 is a third detail view of the longitudinal section of FIG. 9.

FIG. 14 shows a detail view of the top shell of FIG. 13 in the area of a holding rib for a seal not indicated here.

FIG. 15 shows the detail view of FIG. 14 with the seal.

FIG. 16 shows a horizontal longitudinal section of the intake manifold of FIG. 1 through the top shell in the area of the holding rib with the seal.

FIG. 17 shows a vertical longitudinal section of the intake manifold of FIG. 1 through the top shell in the area of the holding rib with the seal.

In the Figures, same components are identified with same reference characters.

DESCRIPTION OF PREFERRED EMBODIMENTS

Figure 9:
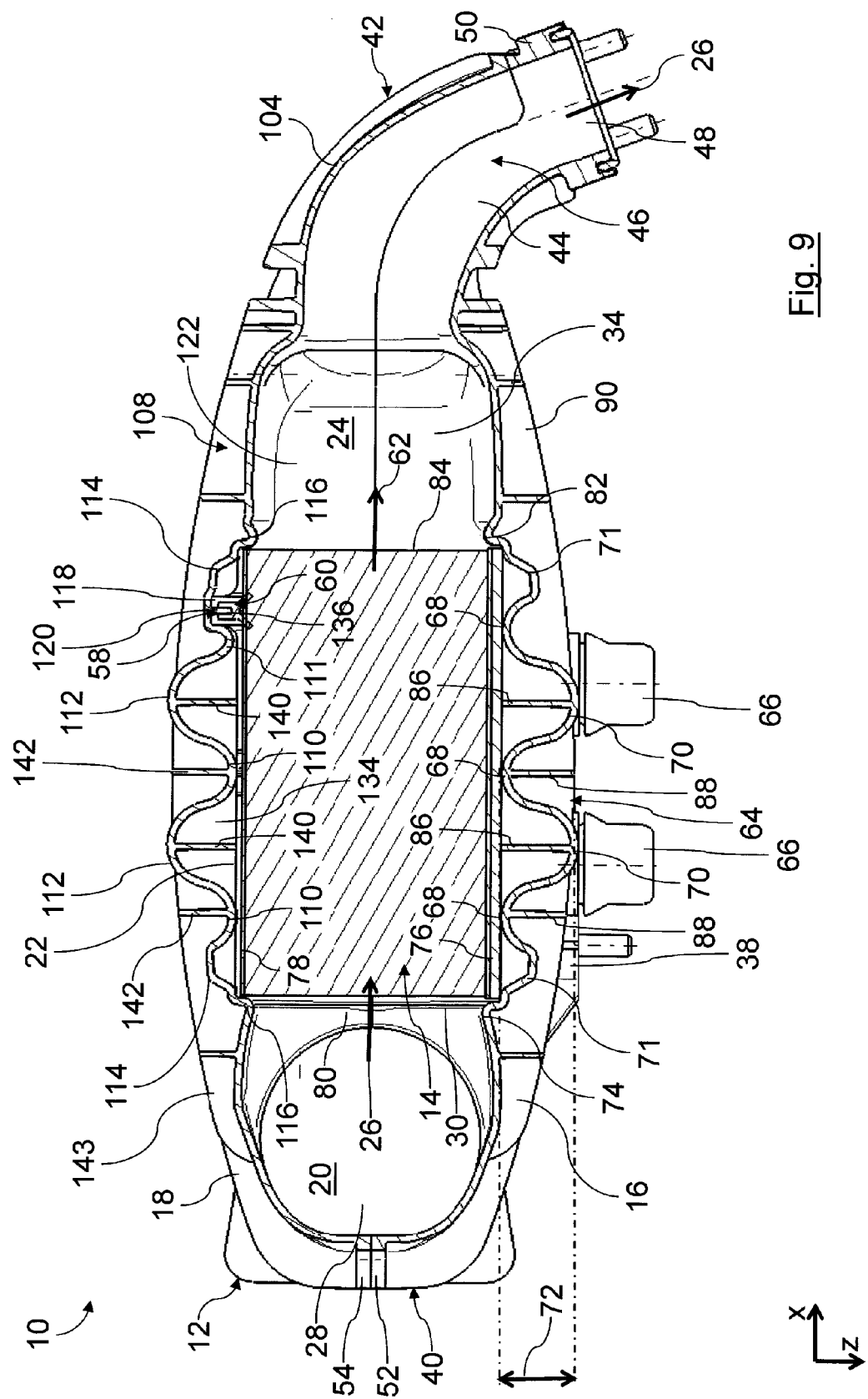
FIG. 9 shows a vertical longitudinal section of the intake manifold of FIG. 1 along a section line IX-IX of FIG. 4.
Figure 10:
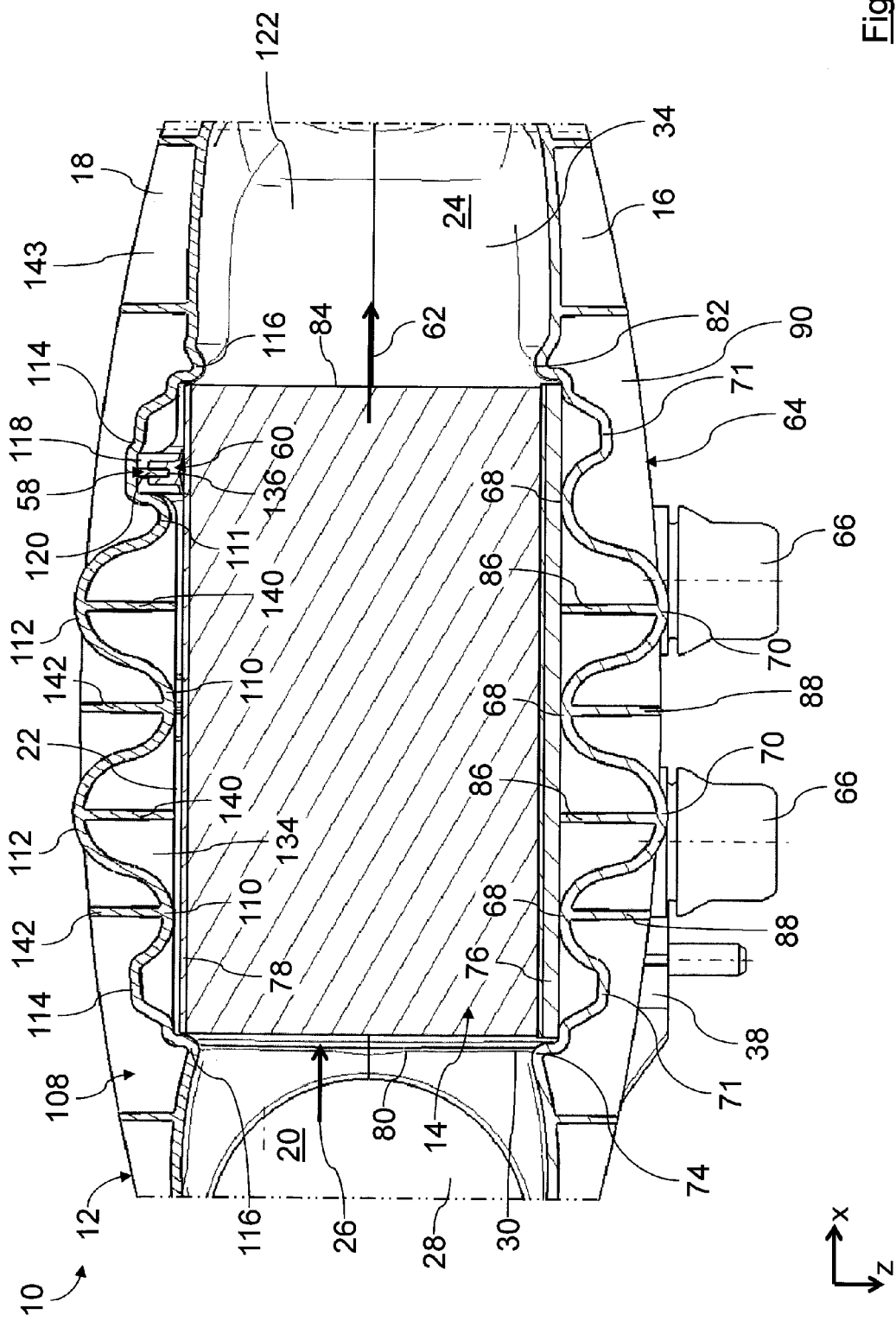
FIG. 10 is a first detail view of the longitudinal section of FIG. 9.

In the FIGS. 1 to 17, an intake manifold 10 of an internal combustion engine of a motor vehicle charged with an exhaust gas turbocharger is illustrated in various perspective views, sections, and detail views.

For better orientation, in the Figs. the corresponding axes of an orthogonal X-Y-Z coordinate system are indicated. In the described embodiment, the z-axis extends in the normal installed position of the intake manifold 10, illustrated in FIG. 1, in vertical spatial direction downwardly. The x-axis and the y-axis define a horizontal plane which is in the following referred to as X-Y plane. The x-axis and the z-axis define an X-Z plane. The y-axis and the z-axis define correspondingly a Y-Z plane.

When in the following "top", "bottom", "front", or "rear" is used, this refers to the illustration of FIG. 1, if not indicated otherwise. The spatial arrangement of the intake manifold 10, as illustrated in FIG. 1, corresponds in general to the installed state in the motor vehicle. The installed state of the intake manifold 10 may however be deviating from it. For example, the intake manifold 10 can also be mounted in reverse.

The intake manifold 10 is arranged in an intake system for combustion air of the internal combustion engine that is connected to an outlet of a compressor of the turbocharger.

The intake manifold 10 comprises an intake manifold housing 12 in which an intercooler 14 is arranged. The intercooler 14 serves for cooling the charge air which is coming from the compressor of the turbocharger and flows through the intake manifold housing 12. The intake manifold 10 serves for distributing the charge air onto the corresponding cylinders of the internal combustion engine. In the present embodiment, the intake manifold 10 serves for distributing the charge air onto four cylinders of the internal combustion engine.

The intake manifold housing 12 is assembled of a connecting shell 16, in FIG. 1 at the bottom, and a top shell 18, at the top. The connecting shell 16 and the cover shell 18 are made of plastic material. The exterior walls of the intake manifold housing 12 are curved or bent outwardly, i.e., dished, in their basic shape.

An interior of the intake manifold housing 12 comprises an intake chamber 20, a cooler chamber 22, and an outlet chamber 24 which are arranged one behind the other with regard to a flow path of the charge air through the intake manifold housing 12. The flow path through the intake manifold housing 12 is indicated in FIGS. 1 to 7 and 9 to 12 by arrows 26.

The connecting shell 16 has at the side of a lower inlet-side longitudinal wall 34, in FIGS. 1 and 2 at the front, an inlet 28 for the charge air. The inlet 28 is arranged in the area of a transition of the inlet-side longitudinal wall 34 into an inlet-side transverse side 40 of the intake manifold housing 12. The inlet 28 opens into the inlet chamber 20. The inlet chamber 20 extends in the direction of the y-axis across the width of the cooler chamber 22.

Immediately behind the inlet 28 there is a two-part partition section 30 in the inlet chamber 20 which extends approximately parallel to the Y-Z plane. The partition section 30 separates a part of the inlet chamber 20 at the front, when viewed from the inlet 28, from the cooler chamber 22. A bottom part of the partition section 30 is connected monolithically with the connecting shell 16. A top part of the partition section 30 is connected monolithically with the cover shell 18.

The inlet 28 is surrounded by an inlet connector flange 32. The inlet connector flange 32 is monolithically connected with the connecting shell 16. With the inlet connector flange 32, a connection to an inlet line of the intake system of the internal combustion engine which extends to the outlet of the compressor of the turbocharger can be realized by means of screw connections. In the inlet line, for example, a throttle valve can be arranged.

A mounting flange 38 is monolithically connected with the connecting shell 16 in the area of the lower inlet-side longitudinal wall 34 and a lower rearward longitudinal wall 36, respectively. The mounting flanges 38 are located on the exterior side of the connecting shell 16 approximately at the level of a transition of the inlet chamber 20 into the cooler chamber 22. The mounting flanges 38 each extend approximately parallel to the X-Y plane. By means of the mounting flanges 38, the intake manifold 10 can be connected by means of a screw, respectively, to a corresponding frame part of the internal combustion engine.

On an outlet-side transverse side 42 of the intake manifold housing 12 that is opposite the inlet-side transverse side 40, the connecting shell 16 has four lower distributor tube sections 44 adjacently arranged relative to the flow path 26. The lower distributor tube sections 44 form each a bottom part of a respective distributor tube 46. Each distributor tube 46 opens into the outlet chamber 24. The outer chamber 24 serves as distributing chamber for distributing the charge air onto the four distributor tubes 46. The distributor tubes 46 each comprise at their free ends an outlet 48 for the charge air. The outlets 48 of the distributor tubes 46 are surrounded by a common outlet connector flange 50. The outlet connector flange 50 is respectively monolithically connected with the lower distributor tube sections 44. By means of the outlet connector flange 50, the distributor tubes 46 are connected, respectively, to the corresponding inlets, not shown, of the cylinders of the internal combustion engine by means of screws.

A rim of the connecting shell 16 which is facing the cover shell 18 is designed as a bottom welding flange 52. The bottom welding flange 52 surrounds externally the inlet chamber 20, the cooler chamber 22, the outlet chamber 24, and the lower distributor tube sections 44. When the intake manifold 10 is assembled, the lower welding flange 52 is welded to the top welding flange 54 of the cover shell 18. In the area of the inlet chamber 20 and of the cooler chamber 22, the weld seam extends between the bottom welding flange 52 and the top welding flange 54 approximately in a plane that is parallel to the X-Z plane, as illustrated, for example, in FIG. 9.

Figure 13:
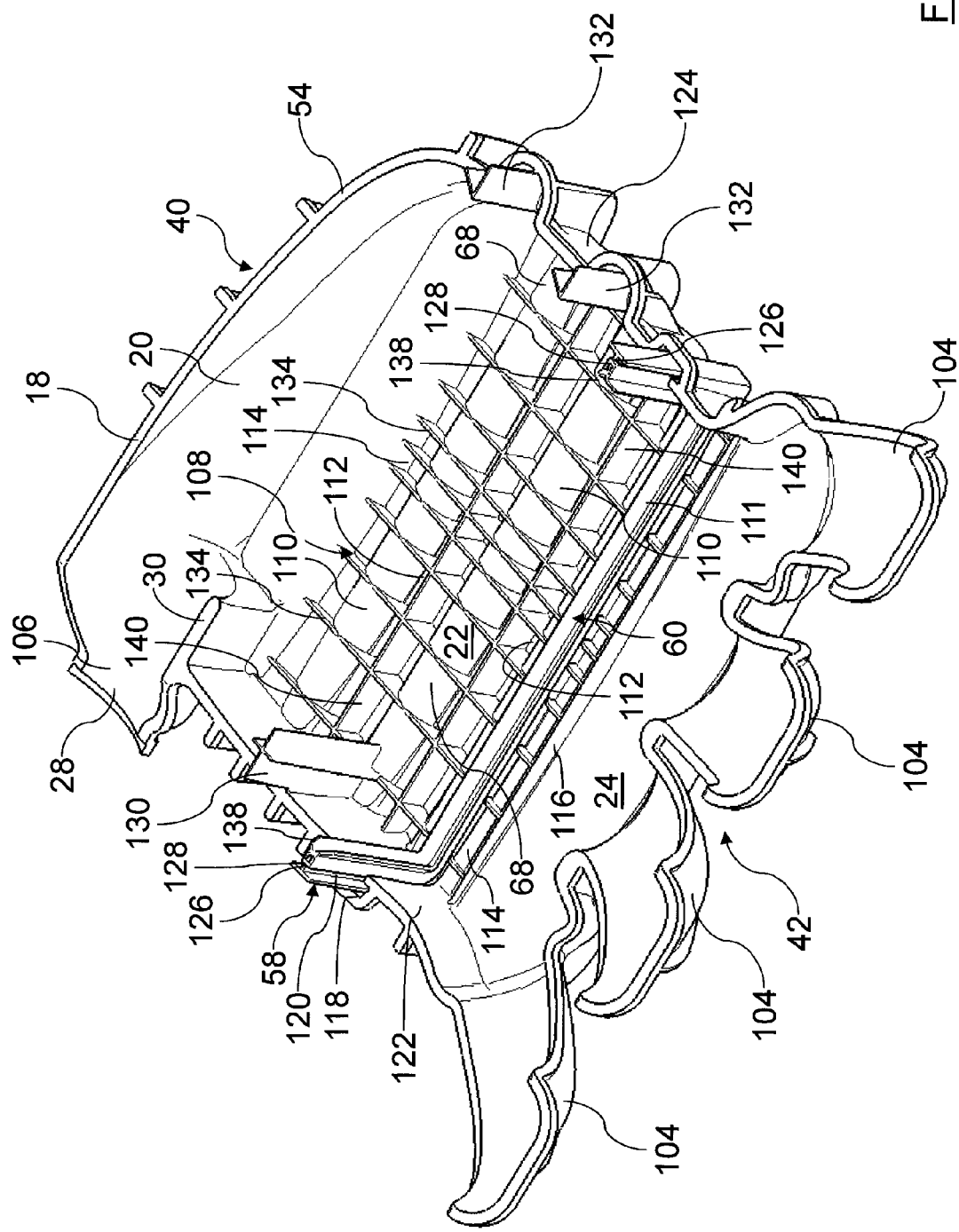
FIG. 13 is an isometric illustration of the top shell of the intake manifold housing of the intake manifold of FIG. 1 in a view of the interior.

The lower longitudinal walls 34 and 36 have each in the area of the cooler chamber 22 in the vicinity of the transition to the outlet chamber 24 a groove-shaped holding receptacle 56. The holding receptacles 56 serve each for receiving a respective leg of a holding rib 58. The holding rib 58 serves for securing a seal 60. The holding ribs 58, as shown, for example, in FIGS. 13 to 15, are attached to the cover shell 18. The holding receptacles 56 are each realized as outer bulges with an approximately U-shaped profile in the longitudinal walls 36 and 38. The holding receptacles 56 extend each approximately in the direction of the z-axis. The holding receptacles 56 are each open across their entire height toward the cooler chamber 22. They each have an undercut on either end of the open side which is facing the cooler chamber 22.

In a bottom side 64 of the connecting shell 16 two coolant connectors 66 of the intercooler 14 are arranged. By means of the coolant connectors 66 the intercooler 14 is supplied with appropriate coolant, for example, cooling water.

The bottom side 64, as shown, for example, in FIGS. 3 and 9 to 11, has in the area of the cooler chamber 22 a corrugated course in the direction of the x-axis. The corrugated course is realized by a total of three lower inner corrugations 68 which are alternatingly arranged with five lower outer corrugations 70, 71. The lower corrugations 68, 70, and 71 are groove-shaped depressions in the bottom side 64. The lower corrugations 68, 70, and 71 each extend with their longitudinal axes approximately parallel to the y-axis. They extend across the entire width in the direction of the y-axis of the cooler chamber 22.

Respective corrugation walls of the lower inner corrugations 68 each have approximately the profile of a section of a circular cylinder wall whose open side is pointing away from the cooler chamber 22 in outward direction. The corrugation walls themselves extend into the cooler chamber 22, therefore the name "inner corrugations". The lower inner corrugations 68 themselves are outwardly open.

Respective corrugation walls of the two central lower outer corrugations 70 have also approximately the profile of sections of circular cylinder walls whose open sides are open toward the interior of the cooler chamber 22, respectively.

A corrugation height 72, which is indicated in FIG. 9, is between approximately 10 mm and approximately 20 mm, preferably approximately 15 mm. The corrugation height 72 corresponds to a spacing between the respective apexes of the corrugation walls of the lower inner corrugations 68 and the two central lower outer corrugations 70.

A corrugation wall of the inlet-side lower outer corrugation 71 that is facing the inlet chamber 20 has on the side that is facing the inlet chamber 20 a lower inlet-side flow contour 74. The lower inlet-side flow contour 74 fits snuggly a lower inlet-side end face edge of a flange plate 76 of a cooler housing 78 of the intercooler 14. The lower inlet-side flow contour 74 extends across the entire width of the cooler chamber 22 in the direction of the y-axis. It forms a ramp of sorts for the flow of the charge air to the inlet side 80 of the intercooler 14. The lower inlet-side flow contour 74 forms a smooth transition from the inlet chamber 22 into the inlet side 80 of the intercooler 14.

A corrugation wall of the outlet-side lower outer corrugation 71 has a lower outlet-side flow contour 82 that is similar to the lower inlet-side flow contour 74 and forms a smooth transition from the outlet side 84 of the intercooler 14 to the outlet chamber 24. The lower outlet-side flow contour 82 engages about a corresponding lower outlet-side end face edge of the flange plate 76.

The flange plate 76 is brazed onto a bottom side of the cooler housing 78 which is facing the bottom side 64 of the connecting shell 16. The flange plate 76 is flat and extends approximately parallel to the X-Y plane. The flange plate 76 is positioned with its exterior side across the entire width in the direction of the y-axis seal-tightly on the apexes of the corrugation walls of the lower inner corrugations 68. Also, the lower inlet-side end face edge and the lower outlet-side end face edge of the flange plate 76 are seal-tightly positioned at the corresponding lower flow contours 74 and 82. In this way, no charge air can flow below the flange plate 76 past the exterior side of the intercooler 14.

Moreover, on the bottom side 64 of the connecting shell 16 on the inner side which is facing the cooler chamber 22 two lower inner transverse reinforcement ribs 86 are arranged. The lower inner transverse reinforcement ribs 86 extend each within one of the two central lower outer corrugations 70 from their bottom to the exterior side of the flange plate 76. They end approximately at the same height as the apexes of the corrugation walls of the neighboring lower inner corrugations 68. The lower inner transverse reinforcement ribs 86 extend each approximately parallel to the Y-Z plane. The lower inner transverse reinforcement ribs 86 are located each approximately centrally within the corresponding lower outer corrugations 70. Their free rims are each positioned seal-tightly on the exterior side of the flange plate 76.

Moreover, two lower outer transverse reinforcement ribs 88 are arranged on the bottom side 64 of the connecting shell 16 on the exterior side of the intake manifold housing 12 which is facing away from the cooler chamber 22. The lower outer transverse reinforcement ribs 88 extend each approximately parallel to the lower inner transverse reinforcement ribs 86. One of the lower outer transverse reinforcement ribs 88 is positioned in the interior of the inlet-side lower corrugation 68. The second lower outer transverse reinforcement rib 88 is arranged in the interior of the central lower inner corrugation 68. The lower outer transverse reinforcement ribs 88 each are located approximately centrally in the corresponding corrugations 68. In the illustration of the FIGS. 2 and 3, the illustration of the lower outer transverse reinforcement ribs 88 has been omitted for better clarity.

Moreover, the bottom side 64 of the connecting shell 16 has at its exterior side a plurality of lower outer longitudinal reinforcement ribs 90. The lower outer longitudinal reinforcement ribs 90 extend each approximately parallel to the X-Z plane. They end in the direction of the z-axis in the area of the central lower outer corrugations 70 approximately at the level of the apexes of the corrugation walls positioned thereat. In the direction of the x-axis, the lower outer longitudinal reinforcement ribs 90 extend across the inlet chamber 20, the cooler chamber 22, and the connecting chamber 24.

In FIGS. 1, 4, and 5, on the exterior side of the lower inlet-side longitudinal wall 34 of the connecting shell 16 several lateral reinforcement ribs are illustrated additionally that each extend approximately parallel to the Y-Z plane. In the other Figures, these lateral reinforcement ribs are not shown for better clarity.

Moreover, viewed in the direction of the x-axis, in the area of the lower inlet-side longitudinal wall 34 of the connecting shell 16 approximately centrally in the cooler chamber 22 a blind bore, shown in FIG. 6, is arranged. The blind bore is open at the side which is facing the cover shell 18. An insert bushing 92 is inserted into the blind bore. The axes of the blind bore and the insert bushing 92 are parallel to the z-axis. The insert bushing 92 is made of metal. It has an inner thread for a corresponding outer thread of a fastening screw 94. The fastening screw 94 is also made of metal. The threads of the insert bushing 92 and of the fastening screw 94 can be preferably metric. Alternatively, also other types of threads can be provided.

The fastening screw 94 extends through a corresponding hole in the flange plate 76 of the intercooler 14. An inner diameter of the hole corresponds approximately to the outer diameter of the fastening screw 94. The fastening screw 94 is arranged relative to a plane that is parallel to the X-Z plane, i.e., radial to its axis, without play in the hole.

The fastening screw 94 and the insert bushing 92 form a fixed bearing 96. The fixed bearing 96 serves for fastening the intercooler 14 in the connecting shell 16. The attachment is stationary relative to the plane that is parallel to the X-Z plane and without preload loss. By connecting the fastening screw 94 of metal with the insert bushing 92 of metal, a fixed connection is provided which maintains its preload even for an extended period of time, preferably for its service life.

Below corresponding semi-circular cylindrical bulges of the lower rearward longitudinal wall 36, two screw holes 98 are arranged in the connecting shell 16 for a thread-forming screw 100, respectively. The screw holes 98 are open, respectively, toward the cover shell 18. The axes of the screw holes 98 extend approximately parallel to the z-axis. One of the screw holes 98 is located approximately at the side of the cooling chamber 22 which is opposite the fixed bearing 96. The other screw hole 98 is located in the vicinity of the inlet chamber 20.

The thread-forming screws 100 extend through corresponding holes in the flanges of the flange plate 76 of the intercooler 14. A respective diameter of the holes is greater than the corresponding outer diameter of the thread-forming screws 100. As long as the thread-forming screws 100 are not tightened yet they are movable radially relative to their respective axis in the holes of the flange plate 76. The screw holes 98 with the respective thread-forming screws 100 form a floating bearing 102, respectively. With the floating bearings 102 the intercooler 14 is fastened in the connecting shell 16. The enlarged holes in the flange plate 76 enable a position-tolerant mounting on this side of the intercooler 14.

The cover shell 18, shown, for example, in detail in FIG. 13, has four upper distributor tube sections 104. When the intake manifold 10 is assembled, the upper distributor tube sections 104 close off one of the lower distributor tube sections 44 of the connecting shell 16, respectively, and thus form part of one of distributor tubes 46, respectively.

Moreover, the cover shell 18 has an inlet cover section 106 which closes off a corresponding lower inlet section of the inlet 28 at the side of the connecting shell 16.

A topside 108 of the cover shell 18, shown at the top in FIGS. 1 and 9, is corrugated similar to the bottom side 64 of the connecting shell 16. It has a total of three upper inner corrugations 110 and 111 and five upper outer corrugations 112 and 114. The two central upper corrugations 112, the inlet-side upper outer corrugation 114, the inlet-side upper inner corrugation 110, and the central upper inner corrugation 110 are positioned, relative to a mirror plane which is parallel to the X-Y plane, approximately mirror-symmetrical to the corresponding lower corrugations 68, 70, and 71.

A corrugation wall of the inlet-side upper outer corrugation 114 has an upper inlet-side flow contour 116 which engages, similar to the lower inlet-side flow contour 74, the upper inlet-side end face edge of the cooler housing 78. It forms in this way a smooth flow transition from the inlet chamber 22 into the inlet side 80 of the intercooler 14.

At a transition between the corrugation walls of the outlet-side upper inner corrugation 111 and the outlet-side upper outer corrugation 114, a seal holder bay 118 is realized which is illustrated in FIG. 17 in detail. The seal holder bay 118 is open toward the cooler chamber 22. In the seal holder bay 118, viewed in the direction of the x-axis, a radial section 120 of the holding rib 58 is approximately centrally arranged and is radial to the main axis 62 of the intercooler 14. The radial section 120 extends approximately in a plane parallel to the Y-Z plane.

The main axis 62 extends through the inlet side 80 and the outlet side 84 of the intercooler 14. The main axis 62 indicates roughly the average flow of the charge air into the intercooler 14 at the inlet side 80 and out of the intercooler 14 at the outlet side 84. The main axis 62 is an imaginary axis. It is only provided for the purpose of orientation. It does not necessarily indicate precisely the average flow direction of the charge air through the intercooler 14. The main axis 62 extends approximately parallel to the x-axis.

The seal holder bay 118 extends into an upper inlet-side longitudinal wall 122 of the cover shell 18 and at the opposite side into an upper rear longitudinal wall 124 of the cover shell 18. The lateral legs of the seal holder bay 118 provided in the upper longitudinal walls 122 and 124 each have an undercut at the open side that is facing the cooler chamber 22.

As a whole, the holding rib 58, viewed in the direction of the x-axis, is approximately U-shaped. Lateral legs of the holding rib 58 project each freely into the corresponding lateral legs of the seal holder bay 118. The lateral legs of the holding rib 58 extend approximately parallel to the z-axis. The lateral legs of the holding rib 58 each project past the upper welding flange 54. When the intake manifold housing 12 is assembled, the lateral legs of the holding rib 58 project into the respective holding receptacles 56 of the connecting shell 16.

The lateral legs of the holding rib 58 have each a T-shaped profile wherein the lower leg of the T-profile forms the radial section 120. At the transitions of the lateral legs to a horizontal section, the holding rib 58 has an approximately round radius of curvature, respectively.

At the end faces of the free ends of the legs of the holding ribs 58, the respective radial section 120 is provided with a seal securing groove 126, respectively. In FIG. 14 one of the seal securing grooves 126 is shown. As illustrated in FIG. 15, a corresponding seal securing web 128 engages in the seal securing groove 126. The seal securing webs 128 are located at the free ends of the legs of the seal 60, respectively.

At the inner side of the upper inlet-side longitudinal wall 122 that is facing the cooler chamber 22 there is moreover a captive securing rib 130 arranged at the fixed bearing. The fixed bearing-side captive securing rib 130 is monolithically connected with the longitudinal wall 122 and the topside 108 of the cover shell 18. The fixed bearing-side captive securing rib 130 has a cross-shaped profile. It extends in its longitudinal direction approximately parallel to the z-axis and projects past the upper welding flange 54. When the intake manifold housing 12 is assembled, the fixed-bearing side captive securing rib 130 is located approximately at the opposite side, in the direction of the z-axis, of the screw head of the fastening screw 94 of the fixed bearing 96. An end face of the fixed bearing-side captive securing rib 130 is located near the screw head and prevents that the fastening screw 94 can unscrew from the insert bushing 92.

Likewise, on the side of the upper rearward longitudinal wall 124, in a respective bulge, two floating bearing-side captive securing ribs 132 for securing the screws 100 of the floating bearings 102 are arranged. The floating bearing-side captive securing ribs 132 have each an approximately L-shaped profile. A first one of the legs of the L-shaped profile extends respectively on the side which is facing away from the cooler chamber 22 approximately in a plane parallel to the Y-Z plane. The other leg extends respectively approximately parallel to the X-Z plane and points away from the first leg toward the inlet chamber 20.

Moreover, the topside 108 of the cover shell 18 has at its inner side a plurality of upper inner longitudinal reinforcement ribs 134. The upper inner longitudinal reinforcement ribs 134 each extend in the area of the cooler chamber 22 approximately parallel to the X-Z plane.

Moreover, the topside 108 has at its inner side a plurality of upper inner transverse reinforcement ribs 140. The upper inner transverse reinforcement ribs 140 extend approximately parallel to the Y-Z plane. The heights of the upper inner longitudinal reinforcement ribs 134 and of the upper inner transverse reinforcement ribs 140 in the direction of the z-axis correspond approximately to the corrugation heights of the wave shape that is formed by the upper corrugations 110, 111, 112, and 114. The upper inner transverse reinforcement ribs 140 are located each within one of the central upper outer corrugations 112.

On the exterior side of the cover shell 18, a plurality of upper outer longitudinal reinforcement ribs 143 and upper outer transverse reinforcement ribs 142 are extending, respectively. The upper outer longitudinal reinforcement ribs 143 extend each approximately parallel to the X-Z plane. The upper outer transverse reinforcement ribs 142 extend each approximately parallel to the Y-Z plane. In accordance with the outer lower transverse reinforcement ribs 88, in the interior spaces of the inlet-side and the central upper inner corrugation 110, an upper outer transverse reinforcement rib 142 is arranged, respectively.

In FIGS. 1 and 13, on the exterior side of the upper inlet-side longitudinal wall 122 of the cover shell 18 several additional lateral reinforcement ribs are additionally illustrated which extend each approximately parallel to the Y-Z plane. In the other Figures, these lateral reinforcement ribs are not shown for the purpose of better clarity.

The seal 60 is made of an elastic material. The seal 60 has a Y-shaped profile, as illustrated, for example, in FIGS. 15 to 17. The two upper legs of the Y-profile are oriented toward the corresponding exterior sides of the intercooler 14. The central leg of the Y-profile extends approximately in a plane parallel to the Y-Z plane. It faces toward the exterior side of the intake manifold housing 12. It has a groove-shaped securing rib receptacle 136 which is open toward the exterior side of the intake manifold housing 12. The radial section 120 of the holding rib 58 is inserted into the holding rib receptacle 136.

The seal 60 is approximately U-shaped when viewed in the direction of the x-axis. It is open at the side which is facing the bottom side 64 of the connecting shell 16 and extends circumferentially relative to the main axis 62. At the free ends of the legs of the seal 60 of which one is shown in an exemplary fashion in FIG. 15, the holding rib receptacle 136 is closed off with the seal securing web 108 provided thereat. By engagement of the seal securing web 128 in the seal securing groove 126 in the radial section 120 of the holding rib 58, the seal 60 is secured at its free end, respectively.

At the free ends of the legs of the seal 60, the two upper legs of the Y-shaped profile are provided each with a bevel 138. The two upper legs of the Y-profile have in their relieved state an opening angle of approximately 90 degrees.

The cooler housing 78 is circumferentially closed relative to the main axis 62 of the intercooler 14. The cooler housing 78 as a whole is approximately parallelepipedal and open at the inlet side 80 and the outlet side 84. The charge air to be cooled can flow in at the inlet side 80 into a heat exchanger area of the intercooler 14, passes through appropriate flow passages in which a heat exchange with the corresponding cooling medium takes place, and can flow out through appropriate openings at the outlet side 84. The intercooler 14 can be, for example, a so-called plate-type cooler. In the heat exchanger area flow areas for the charge air are fluid-tightly separated from flow areas for the coolant and are thermally connected to each other.

On the side of the cooler housing that is facing the lower inlet-side longitudinal wall 34 of the connecting shell 16 and the upper inlet-side longitudinal wall 122 of the cover shell 18, the cooler housing 78 has a recess 144. The recess 144 extends across the entire height of the cooler housing 78 in the direction of the z-axis. Through the recess 144 the fastening screw 94 of the fixed bearing 96 can be introduced.

In the assembled intake manifold 10, the apexes of the corrugation walls of the upper inner corrugations 110 and 111 which are facing the intercooler 14, the free rims of the upper inner transverse reinforcement ribs 140 and of the upper inner longitudinal reinforcement ribs 134 are each spaced apart from the upper exterior side of the cooler housing 78 located thereat.

A sealing of the sidewalls and the top wall of the cooler housing 78 relative to the inner side of the intake manifold housing 12 is realized by means of seal 60 in a position-tolerant way.

For assembly of the intake manifold 10, the intercooler 14 is first inserted with the coolant connectors 66 leading in the direction of the z-axis into the cooler chamber 22 of the connecting shell 16.

The fastening screw 94 of the fixed bearing 96 is screwed in through the corresponding hole in the flange plate 76 into the thread of the insert bushing 92 and tightened up to the stop. The intercooler 14 is secured with the fixed bearing 96 without preload loss for the lifetime in the connecting shell 16.

Subsequently, the thread-forming screws 100 of the floating bearings 102 are screwed in through the corresponding holes in the flanges of the flange plate 76 into the corresponding screw holes 98 of the connecting shell 16. The thread-forming screws 100 are tightened up to the stop. The intercooler 14 is thus also fixed at this side on the connecting shell 16. The floating bearings 102 may have over their lifetime a preload loss.

The lower flow contours 74 and 82, the apexes of the corrugation walls of the lower inner corrugations 68, and the rims of the lower inner transversely extending transverse reinforcement ribs 86 are positioned seal-tightly on the exterior side of the flange plate 76. In this way, no charge air can bypass the intercooler 14.

Subsequently, the cover shell 18 is mounted from above in the direction of the z-axis onto the connecting shell 16. In this context, the free legs of the holding ribs 58 and the seal 60 are inserted into the corresponding holding receptacles 56 of the connecting shell 16. The bevels 138 simplify pushing on the seal 60 onto the cooler housing 78. The two upper legs of the Y-profile of the seal 60 bend apart in the direction of the x-axis. The two upper legs of the Y-profile of the seal 60 snuggly fit the corresponding exterior sides of the cooler housing 78.

The end faces of the captive securing ribs 130 and 132 of the cover shell 18 are located in the final mounted state of the cover shell 18 on the corresponding heads of the fastening screw 94 and the thread-forming screws 100.

The connecting shell 16 and the cover shell 18 are welded to each other along the lower fastening flange 52 and the upper fastening flange 54.

The assembled intake manifold 10 is connected by means of the outlet connector flange 50 with the cylinders of the internal combustion engine. The intake manifold housing 12 is fastened with the fastening flanges 38 on the frame part of the internal combustion engine. The inlet connector flange 32 is connected with the inlet line.

While specific embodiments of the invention have been shown and described in detail to illustrate the inventive principles, it will be understood that the invention may be embodied otherwise without departing from such principles.

What is claimed is:
1. An air-guiding component for a charged internal combustion engine, the air-guiding component comprising:
   an intercooler provided with coolant connectors;
   a housing wherein the intercooler is disposed in the housing;

the housing comprising at least two housing parts including a basic housing part;
the housing provided with at least one inlet and at least one outlet for charge air and further provided with at least one passage for the coolant connectors of the intercooler;
wherein the intercooler is arranged between the at least one inlet and the at least one outlet so as to be flowed through by the charge air;
wherein the housing has housing walls and at least one of the housing walls has at least one corrugation.

2. The air-guiding component according to claim 1, wherein
the at least one corrugation is an inner corrugation and has a corrugation wall with an exterior side,
wherein the exterior side of the corrugation wall faces the intercooler and rests seal-tightly on an exterior side of the intercooler that is facing the corrugation wall.

3. The air-guiding component according to claim 2, wherein
the exterior side of the intercooler is a flange plate of the intercooler.

4. The air-guiding component according to claim 1, wherein
the at least one corrugation is an inner corrugation and has a corrugation wall that faces the intercooler and is spaced apart from an exterior side of the intercooler that is facing the corrugation wall.

5. The air-guiding component according to claim 1, wherein
in or on the at least one corrugation at least one reinforcement rib is arranged.

6. The air-guiding component according to claim 5, wherein
the at least one reinforcement rib is an inner reinforcement rib that has a free rim supported on an exterior side of the intercooler that is facing the free rim.

7. The air-guiding component according to claim 5, wherein
the at least one reinforcement rib is an inner reinforcement rib that has a free rim that is spaced apart from an exterior side of the intercooler that is facing the free rim.

8. The air-guiding component according to claim 1, wherein
the at least one corrugation is arranged at an inlet side of the intercooler or an outlet side of the intercooler and has a corrugation wall provided with a flow contour.

9. The air-guiding component according to claim 1, wherein
the at least one corrugation has a corrugation wall that at least partially forms a seal receptacle for a seal device.

10. The air-guiding component according to claim 1, wherein
the intercooler is fastened to the basic housing part by a fastening device such that the intercooler separates at least on one side of the basic housing part the at least one inlet seal-tightly from the at least one outlet.

11. The air-guiding component according to claim 10, wherein
the intercooler, when the air-guiding component is assembled, seal-tightly separates the at least one inlet and the at least one outlet relative to all of the at least two housing parts of the housing adjoining the intercooler.

12. The air-guiding component according to claim 1, comprising
at least one fixed bearing and at least one floating bearing that together fasten the intercooler to the housing.

13. The air-guiding component according to claim 12, wherein
the at least one fixed bearing and the at least one floating bearing fasten the intercooler to the basic housing part of the housing.

14. The air-guiding component according to claim 12, further comprising
at least one captive action device that secures at least one rotation/insertion element of the at least one fixed bearing.

15. The air-guiding component according to claim 12, further comprising
at least one captive action device that secures at least one rotation/insertion element of the at least one floating bearing.

16. The air-guiding component according to claim 1, wherein
at least one of the at least one inlet, the at least one outlet, and
the at least one passage for the coolant connectors is arranged on the basic housing part.

17. The air-guiding component according to claim 1, further comprising
at least one seal that is arranged between at least one exterior side of the intercooler and one of the housing walls of the housing that is facing the at least one exterior side of the intercooler.

18. The air-guiding component according to claim 17, further comprising
at least one seal holder for the at least one seal,
wherein the at least one seal holder is arranged in one of the at least two housing parts.

* * * * *